United States Patent [19]

Credali et al.

[11] 4,123,424

[45] Oct. 31, 1978

[54] POLYMERIC PIPERAZINAMIDES AND MEMBRANES FOR REVERSE OSMOSIS MADE THEREFROM

[75] Inventors: Lino Credali, Casalecchio di Reno (Bologna); Vincenzo Guidotti, Milan, both of Italy

[73] Assignee: Montedison S.p.A., Milan, Italy

[21] Appl. No.: 634,760

[22] Filed: Nov. 24, 1975

Related U.S. Application Data

[63] Continuation of Ser. No. 466,677, May 3, 1974, abandoned.

[30] Foreign Application Priority Data

May 7, 1973 [IT] Italy ................................ 23770 A/73

[51] Int. Cl.$^2$ ...................... C08G 69/26; B01D 39/16
[52] U.S. Cl. ................................... 528/337; 210/23 H; 210/500 M; 260/30.2; 260/30.8 R; 260/30.8 DS; 260/32.6 NA; 264/203; 264/212; 528/341; 528/339
[58] Field of Search .............. 260/78 UA; 210/500 M

[56] References Cited

U.S. PATENT DOCUMENTS

| | | | |
|---|---|---|---|
| 3,664,986 | 5/1972 | MacDonald | 260/78 R |
| 3,935,172 | 1/1976 | Vogl et al. | 260/78 R |

OTHER PUBLICATIONS

The Condensed Chemical Dictionary, Eighth Edition, p. 64.
Chemical Abstracts, vol. 71, 1969, 22399e.
Ukr. Khim. Zh., (Journal of Ukranian Chemistry), 1969, 35(4), pp. 390–392, Sarzhevskaya et al.

*Primary Examiner*—Harold D. Anderson
*Attorney, Agent, or Firm*—Hubbell, Cohen, Stiefel & Gross

[57] ABSTRACT

Polymeric piperazinamides suitable for use in reverse osmosis membranes. These polymeric piperazineamides consist essentially of the repeating unit

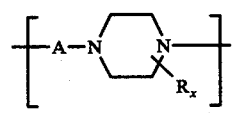

(I)

wherein x is zero or a whole number from 1 to 8, R is a substituent such as alkyl, and —A— is a bivalent radical, namely an organic dicarbonyl radical which either is always of the formula

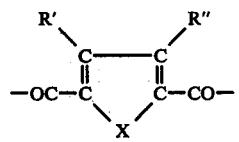

(III)

wherein X is oxygen or sulfur, and R' and R" are each hydrogen, alkyl, or aryl, or else where some of said radicals —A— are of formula (III) and the remainder of said radicals —A— are organic dicarbonyl radicals differing from said formula (III).

3 Claims, No Drawings

POLYMERIC PIPERAZINAMIDES AND MEMBRANES FOR REVERSE OSMOSIS MADE THEREFROM

This is a continuation of application Ser. No. 466,677, filed May 3, 1974, now abandoned.

BACKGROUND OF THE INVENTION

1. Field of the Invention

The present invention relates to new polymeric piperazinamides, to reverse osmosis membranes based on said polymeric piperazinamides, and to a process for the preparation of such membranes.

2. Description of the Prior Art

Membranes with selective permeability are known. Likewise, the principle of reverse osmosis is well known. According to this principle, if a solution of one or more solutes in a common solvent is pumped against a permoselective (semipermeable) membrane at a pressure greater than the osmotic pressure of the solution, one can effect separation of the components of the solution.

For a considerable time the reverse osmosis technique has been applied in desalinization of brackish water and sea water. For this purpose the membranes that are used must permit the passage of water therethrough while at the same time rejecting the salts dissolved therein.

Reverse osmosis membranes, to be practicable and economical, should be capable of permitting a high flow of water therethrough, yet should also exhibit a high capacity for rejection of dissolved salts. Membranes suitable for such use may have various different physical structures. The polymeric material that forms the membrane may, in fact, exhibit either:

(1) a dense and homogeneous structure in the form of a supported ultra thin film, or in the form of a hollow fiber; or (2) a non-homogeneous structure in the form of an "anisotropic gel" membrane or a "skin-like" membrane, consisting of a thin surface layer of a superficial dense and homogeneous polymer having a thickness generally of from $0.1-0.2\mu$ or less, and a porous substructure, the function of which is to support the thin layer.

It is known that the high water permeability of the "anisotropic gel" membranes (or skin-like membranes) is in part due to their low thickness, which is also responsible for the desalinating capacity of the membrane. The term "anisotropic" means that the thin and homogeneous layer, which is active in desalination, is present only on one of the two faces of the membrane.

The polymeric material usually used in the preparation of anisotropic membranes is cellulose acetate. Indeed, cellulose acetate membranes are generally used in the practice of reverse osmosis.

Besides cellulose acetate, only a few other polymeric materials are known to be capable of yielding anisotropic gel membranes (or skin-like membranes) which can give rise to a great flow of water and a high saline rejection.

In Italian Pat. Nos. 868,524 and 868,525, it is taught that polyamides derived from piperazine may be usefully employed in the preparation of membranes suited for desalinization of water by means of reverse osmosis. While the polymers described in those patents may be transformed into non-anisotropic gel type membranes, these membranes exhibit characteristics that are not altogether satisfactory.

The present invention provides polymeric piperazinamides capable of being easily transformed into "anisotropic gel" membranes. The invention further provides a process for the preparation of anisotropic membranes for reverse osmosis based on polymeric piperazinamides.

SUMMARY OF THE INVENTION

The polymeric piperazinamides used in accordance with this invention have a structure consisting essentially of by the repeating unit defined by the general formula (I):

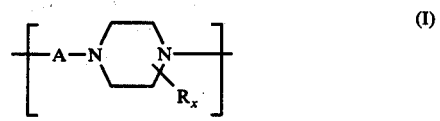

wherein the group defined by the general formula (II):

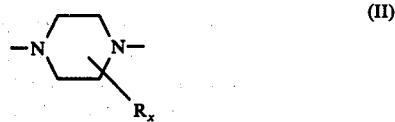

is a bisvalent piperazine radical $x$ is zero or a whole number from 1 to 8; when $x$ is not zero, R is a substituent such as alkyl, in particular, methyl or ethyl; the groups (II) may be present in the polymeric chain in differing degrees of substitution; the substituents R, when present in a number greater than 1, may be arranged in any steric position with respect to the piperazine ring, so that formulas (I) and (II) include pure stereoisomers (cistrans) as well as mixtures of the polysubstituted derivatives of piperazine; —A— represents an organic dicarbonyl radical derived from a dicarboxylic acid; said —A— radicals may be all of the structure (III):

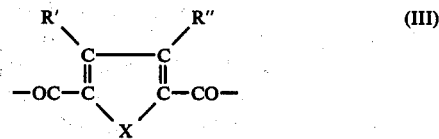

wherein X is oxygen or sulfur, and R' and R" may each be hydrogen, alkyl, or aryl radicals; or said —A— radicals may be constituted in part by radicals of type (III) and also by one or more organic dicarbonyl radicals derived from aliphatic or cycloaliphatic, saturated or unsaturated, aromatic, or heterocyclic dicarboxylic acids (differing from those of formula III).

When radicals of type (III) are present in quantities equal to or greater than 10 mol percent based on the total dicarboxylic radicals present, polyamides are obtained having such solubility characteristics as to make their application in the preparation of anisotropic membranes for reverse osmosis extremely suitable.

DESCRIPTION OF THE PREFERRED EMBODIMENTS

Referring to the foregoing Summary of the Invention, specific examples of dicarbonylic radicals which may be present, in addition to those defined by formula (III), in the polyamides of this invention, include the following:

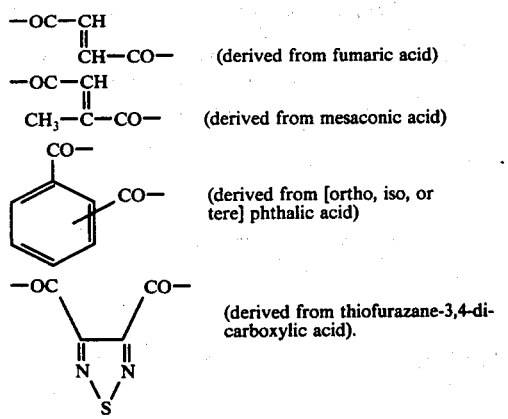

The polymeric piperazinamides according to this invention may be prepared according to known techniques of interfacial polycondensation, or in solution at low temperature, by condensation between the dichlorides of di-carboxylic acids with piperazine and/or substituted piperazines.

According to a preferred method, a polycondensation is carried out using the interfacial method, by dissolving the piperazine in a generally aqueous liquid phase and by reacting the solution with the dichloride or with mixtures of the dichlorides of the dicarboxylic acids dissolved in a second liquid phase that is immiscible with the former.

The polycondensation temperature may vary from the freezing point of the phase with the higher freezing point, up to the decomposition temperature of the reactants. The preferred temperature range is from about $-10°$ to $+70°$ C.

Particularly suitable solvents for the dichlorides of the acids are: benzene, chlorobenzene, dichloromethane, chloroform, toluene, xylene, carbon tetrachloride, and cyclohexanone.

The concentration of the dichlorides of the acids and of the piperazine may vary within a wide range of values, from pure reactants to very dilute solutions (0.001 mol/liter).

In general, the interfacial polycondensation is carried out by using an acceptor for hydrochloric acid which forms during the reaction. The acceptor may be either an organic or inorganic base or piperazine itself. Particularly suitable are: sodium hydroxide, potassium hydroxide, sodium carbonate, magnesium oxide and triethylamine.

When the polycondensation is carried out in solution at low temperature, desirably the same solvents are used both for piperazine and for the acid dichloride.

The polycondensation is effected mixing together the solutions of the single reactants. When mixtures of two or more dichlorides are used, these may be added successively one to the other.

Dichloromethane, chloroform, N-methylpyrrolidone and/or dimethylacetamide are preferably used as solvents.

Polycondensation at low temperature may also be effected in the presence of an organic acceptor such as: trimethylamine, dimethylaniline, N-methylmorpholine, pyridine, or piperazine which itself is used as the reactant in the polycondensation. The concentration of the monomers may vary from reactants with a purity degree of 100% up to very dilute solutions. The temperature may vary from $-20°$ C. to $+25°$ C.

Such polymeric piperazinamides are characterized by an inherent viscosity (measured at 30° C. in a solution of 0.5 g of polymer in 99.5 g of a 98% $H_2SO_4$) in general greater than 0.5, and preferably from about 1 to 6.

The membranes of this invention have an anisotropic structure characterized by a thick and homogeneous layer, which insures a high capacity for rejecting salts, and by a porous understructure serving as a carrier or support.

Membranes of the above described type are prepared by a process involving the following sequential steps:
First step: Preparing a solution of the polymeric piperazinamide in a suitable organic solvent;
Second step: Spreading the solution over a flat plate to thereby form the membrane;
Third step: Partial evaporation of the solvent;
Fourth step: Coagulation of the membrane by dipping in water; and
Fifth step: Thermal treatment of the membrane.

First step

The concentration of the polyamide in the solution may vary within a wide range, generally from about 5 to 60%, but preferably between 8 and 25% by weight, with respect to the weight of the solution.

For the preparation of the solution, water-soluble organic polar solvents of the polymer are used, said solvents belonging to the $m$-class of the solvents forming hydrogen bonds ($m$-H bonding group), and having a solubility parameter $\delta > 8$ (cal/cc)$^{\frac{1}{2}}$, according to the classification given by H. Burrell in "Polymer Handbook", IV — 341, J. Brandrup, E. N. Immergut, Editor, Interscience, N. Y.

Examples of such solvents are: dimethylformamide, dimethylacetamide, diethylformamide, diethylacetamide, dimethylsulfoxide, N-methylpyrrolidone, tetramethylsulfone, etc.

Preferred solvents are: N-methylpyrrolidone and di-methylacetamide. A salt soluble in water and in the organic solvent may be present as a third component of the solution. Examples of such salts are: LiCl, $LiNO_3$, LiBr, $CaCl_2$, $ZnCl_2$, $MgCl_2$, $MgClO_4$, and the like.

Besides the saline component, water may sometimes be present as a fourth component of the solution. In general the salt may be present in the solution in a high quantity, in ratio, by weight polymer/salt, between 1 and 2.

The solution may be prepared in different ways. For instance by using a mechanical "Werner & Pfleiderer mixer", and then filtering through a porous diaphragm or a filtering membrane or by different filtering systems.

The properties of the membranes obtained from this solution depend very much on the quality of the solution. Particularly satisfactory results are obtained by treating the solution, however it has been prepared, at a temperature greater than 70° C., and in general at a temperature between 80° C. and the boiling or degrading temperature of the solvent. According to a preferred process, N-methylpyrrolidone is used as the solvent and the solution is treated at a temperature greater than 160° C.

Second step

The solution obtained in the first step is spread over a flat plate, generally a glass plate, as by means of a film spreader, to form a film. The spreading is generally carried out at room temperature and the thickness of the resulting film may vary within a wide range, in general from about 0.002 to 0.2 cm.

Sometimes, in order to increase the distribution of the solution during the spreading step, the solution may be heated at a temperature greater than room temperature. In this way it is possible to obtain membranes which, in the final step, will be flat. As a forming support, rather than glass, any other suitable material may be used such as, for instance, a metal plate, a polyethylene-terephthalate film, a polytetrafluoroethylene film, porous supports, woven and non-woven fabrics, paper and other such like materials, in either a flat, tubular, or other shape as desired.

Third step

The membrane, cast on the glass plate, is heated to evaporate a portion of the solvent. The time and temperature of the partial evaporation of the solvent may vary within a wide range, depending on the type of solvent used, on the composition of the solution, and on the thickness of the membrane one wishes to obtain. The temperature at which partial solvent evaporation is effected is generally from about 70° C. to 200° C., and preferably from about 80° C. to 180° C. The evaporation time generally will be from as little as one minute up to about 3 hours, but preferably is from 3 to 30 minutes.

Fourth step

After the partial solvent evaporation, the membrane is coagulated into a gel-type structure by immersion in water. The temperature of the coagulation bath in general is from about 0° C. to 30° C., but preferably is from about 0° C. to 5° C. Sometimes it is useful to use as a coagulation bath an aqueous saline solution. Salts that may be dissolved in water are: NaCl, $CaCl_2$ and the like. Sometimes there may also advantageously be added to the coagulation bath a water soluble organic solvent such as an alcohol, a ketone such as acetone, etc.

The coagulation time may vary within a very wide range. In general, the membranes are kept in the coagulation bath at a temperature between 0° C. and 5° C. for about 60 minutes. They are then maintained for storage in water at room temperature.

Fifth Step

The membranes according to this invention, as obtained from the fourth step, occasionally do not exhibit entirely satisfactory reverse osmosis characteristics, in that although the water flow rate is very high, in general greater than 500 liter/$m^2$d, the saline rejection may be below 50%.

Thermal treatment, which entails the fifth step of the process of the invention, overcomes these drawbacks and causes a considerable and lasting increase in the desalinizing capacity of the membrane.

Thermal treatment of the membrane may be carried out in a number of different ways. According to a preferred embodiment, the membrane is placed into hot water for a period of from about 1 minute to 5 hours, at a temperature of from about 60° C. to 100° C.

In the choice of the treating time and temperature, one must consider that when increasing both the time and the temperature, there occurs in general an increase in saline rejection and a decrease in water flow.

The present invention has primary application to anisotropic-gel membranes in flat form. Of course, however, membranes according to the invention also may be prepared in a tubular shape or as a hollow fiber, following techniques well known to those skilled in the art.

According to this invention, "anisotropic gel" membranes are prepared which have a face capable of rejecting the salts in a reverse osmosis process, and a porous understructure which will allow a high degree of water flow.

The antisotropic structure of such membranes is evidenced by means of two reverse osmosis tests. In the first test, the membrane is placed in a reverse osmosis cell with the dense and homogeneous face directed towards the saline solution to be treated. The membrane will show a high water flow and a high saline rejection.

In the second test, the same membrane is placed into the reverse osmosis cell with the porous surface facing the saline solution to be treated. In this instance the membrane still exhibits a high water flow, but the saline rejection is practically nil. The "gel" structure of the membrane is evidenced by the high content of water of the membranes — more than 20% by weight, and generally between 40 and 80% by weight.

The permeability to water of the membranes may be defined as follows:

$$\text{flow of water } (\text{lt}/m^2 d) = \frac{\text{water passed (lt)}}{\text{membrane surface (sq.m)} \times \text{time (days)}}$$

or it may be defined as constant of membrane A in the following way:

$$\text{Constant of membrane } (\text{lt/sq.m. } d.\text{atm}) = A = \frac{\text{flow of water } (\text{lt}/m^2 d)}{\text{actual applied pressure (atm)}}$$

wherein by the term "actual applied pressure" is meant the difference ($\Delta P - \Delta \pi$), in which $\Delta P$ is the difference in hydraulic pressure applied on both sides of the membrane, and where $\Delta \pi$ is the difference in osmotic pressure between the fed solution and the solution that passes through the membrane.

The membranes according to this invention, in general, show a high membrane constant.

For instance, membranes with a saline rejection exceeding 98%, which permit desalination of sea water in a single pass, may be obtained according to this invention with a membrane constant greater than 3.2 lt/$m^2$d. atm (which corresponds, with an applied pressure of 80 atm. and with a feed of 35,000 ppm of NaCl, to a flow of about 200 lt/$m^2$d.); or membranes suitable for desalination of brackish water with a saline rejection of more than 90%, may be obtained with a membrane constant greater than 8.3 lt/$m^2$d. atm (which corresponds, with a pressure of 80 atm and with a feed of 10,000 ppm of NaCl, to a flow of about 600 lt/$m^2$d.).

The osmotic pressure (in atm) for a NaCl solution may be approximately calculated by the equation $\pi = 8.2 \times C_1$, wherein $C_1$ is the saline concentration of the solution in percent by weight.

As is known, the greater the membrane constant and its saline rejection of the membrane, the higher is its efficiency. The membranes of this invention enable one to obtain, in a single pass, desalinized water (with a salt content of less than 500 ppm), starting from brackish water or sea water, with water flow rates that make this application extremely practicable. Moreover, for some types of treatment, it may be feasible to obtain membranes with such greater flow rates and with a lower saline rejection.

Thus, it is possible to obtain membranes with a constant A between 50 and 90 lt/m²d. atm, and with a saline rejection between 50 and 90%.

The membranes of this invention show a particular resistance to compaction due to the effect of applied pressure, and this resistance ensures a long life for the membrane. This good resistance to compaction makes these membranes particularly suited to desalination of sea water, wherein rather high pressures are applied.

The membranes of this invention are, moreover, most effective in various separation and concentration processes in which the principle of inverse osmosis may be applied, such as, for instance: purification of polluted drainage or sewage waters, recovery of undissolved organic substances; recovery of dissolved inorganic substances; treatment of alimentary solutions such as milk, coffee, tea, grapefruit juice, whey, tomato juice, sugary solutions; separation of azeotropes; separation and concentration of biological and pharmaceutical products such as hormones, proteins, vitamins, antibiotics, vaccines, amino acids, and in many other such like processes.

The following examples will further illustrate the invention. All parts are by weight unless otherwise stated.

EXAMPLE 1

Preparation of a co-polypiperazinamide of furan-2,5-dicarboxylic acid with thiofurazan-3,4-dicarboxylic acid A solution was introduced into a three-necked 1 liter flask, fitted with a stirrer and a dripping funnel, consisting of 300 ml of dichloromethane and 36.54 g of trans-2,5-dimethylpiperazine.

A solution consisting of 150 ml of dichloromethane containing 16.88 g of the dichloride of thiofurazan-3,4-dicarboxylic acid was then admixed to the diamine solution over a period of 1 hour.

This mixture was then kept under stirring for one hour. Thereafter, there were added 150 ml of dichloromethane containing 15.44 g of the dichloride of furan-2,5-dicarboxylic acid.

After one hour, the solution was poured into 3 liters of n-hexane and the polymer which separated therefrom was filtered. The polymer, after washing, was dried in an oven at 60° C. under vacuum. The yield was 95%, and the inherent viscosity $\eta_{in}$ (determined in $H_2SO_4$ at 98%, at a concentration of 0.5 g/100 ml of solvent, at 30° C.) was equal to 2.85.

EXAMPLE 2

Preparation of a polypiperazinamide of furan-2,5-dicarboxylic acid

A solution consisting of 400 ml of water, 4.56 g of trans-2,5-dimethylpiperazine, and 10.18 g of anhydrous $Na_2CO_3$, was poured into a 1.9 liter glass reactor equipped with external cooling.

This solution was then vigorously stirred and, through a lateral funnel, there was rapidly added a solution consisting of 100 ml of dichloromethane and 7.72 g of the dichloride of furan-2,5-dicarboxylic acid.

After 15 minutes the stirring was stopped and dichloromethane was evaporated under vacuum. The thus obtained polymer was ground and then suspended in water under vigorous stirring. This suspension was then filtered, repeatedly washed with water, and then dried under vacuum at 50° C.

The yield amounted to about 95%, while the inherent viscosity (determined in $H_2SO_4$ at 98 percent by weight, with a concentration of 0.5 of polymer/100 ml of solvent, at 30° C.) was equal to 3.27.

EXAMPLE 3

13.5 g of the co-polypiperazinamide prepared according to Example 1 were suspended, at room temperature, in 86.5 g of a solution consisting of 82.15 g of N-methylpyrrolidone and 4.35 g of LiCl. This suspension was then brought up to 140° C. under stirring. A rapid formation occurred of a transparent and clear solution which was filtered at a temperature of 95° C. through a filter having a porosity of 5μ.

The solution was then degassed, heated to 50° C. and, finally, spread over a flat glass plate of 0.2 cm thickness to form a film of 0.045 cm thickness.

This glass plate was then heated on an electric heater for 10 minutes at 120° C. The glass plate was then cooled to room temperature in 90 seconds and then dipped into a vessel containing water and ice.

After about 10 minutes of immersion in this water and ice, the membrane was peeled off the glass plate. The membrane was then kept in water and ice for a further 50 minutes, and was then preserved in water at room temperature.

The membrane has a positive and a negative side. By "positive side" is meant that side of the membrane not contacting the glass plate during the preparation; conversely, by "negative side" is meant that face of the membrane which was in contact with the glass plate during preparation.

The water content of this membrane was about 61%. This membrane was placed into a standard reverse osmosis cell in which an aqueous solution, containing 10,000 ppm of sodium chloride, was circulated. The membrane was placed into the cell, taking care that the side facing the solution to be desalinized was the positive side.

The saline solution was circulated in the cell under a pressure of 80 atm. The thus obtained water flow was 2000 lt/m²d., while the saline rejection amounted to 51.5%.

EXAMPLE 4

A membrane prepared according to Example 3 was subjected to a thermal treatment by dipping for 15 minutes into water at 80° C. This membrane was then placed in a reverse osmosis cell according to the procedures described in Example 3, thereby obtaining a water flow of 380 lt/m²d. and a saline rejection of 98%.

EXAMPLE 5

10 grams of the polyamide prepared according to Example 2 were suspended at room temperature in a solution consisting of 85.5 g of N-methylpyrrolidone and 4.5 g of LiCl. This suspension was then treated according to the procedures described in Example 3, and there was obtained a solution which was filtered through a filter having a porosity of 5μ.

The solution was then degassed, heated at 50° C., and spread over a glass plate of 0.2 cm thickness to form a film with a thickness of 0.03 cm. The glass plate was then heated on an electrical heater for 8 minutes at 120° C., and thereafter was cooled in 90 seconds to room temperature, and was then dipped into a vessel containing water and ice.

After about 10 minutes of immersion in water and ice, the membrane was removed from the glass plate. The membrane was then kept in water and ice for a further 50 minutes, and was finally preserved in water at room temperature.

The water content of the membrane amounted to 64%. The membrane was placed in a reverse osmosis cell according to the procedures described in Example 3, thereby obtaining a water flow of 1200 lt/m²d. and a saline rejection of 92%.

EXAMPLE 6

According to the procedures of Example 5, a solution was prepared which contained 10 g of poly(trans-2,5-dimethylpiperazine-3,4-furanamide), characterized by $\eta_{in}=4$.

The solution was then spread over a 0.2 cm thick glass plate, to form a film of 0.045 cm thickness. The glass plate was then heated on an electric heater for 15 minutes at 100° C. The glass plate was then cooled in 90 seconds to room temperature, and was subsequently immersed into a water and ice containing vessel.

After about 10 minutes of immersion in water and ice, the membrane could be removed from the glass plate. The membrane was kept in water and ice for a further 50 minutes and thereafter preserved in water at room temperature. The membrane, when placed into a reverse osmosis cell according to the procedures described in Example 3, showed a water flow of 690 lt/m²d. and a saline rejection of 96%.

Variations can, of course, be made without departing from the spirit and scope of the invention.

Having thus described the invention, what is desired to be secured by Letters Patent and hereby claimed is:

1. A membrane forming polymeric piperazinamide consisting essentially of the repeating unit having a structure defined by the formula (I):

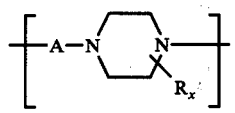

wherein the group defined by the general formula (II):

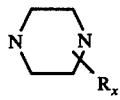

is a bivalent piperazine radical, wherein x is zero or a whole number from 1 to 8, and where, when x is not zero, R is alkyl; said —A— groups representing at least two different dicarbonylic groups, a first dicarboxylic group having a structure defined by the formula (III):

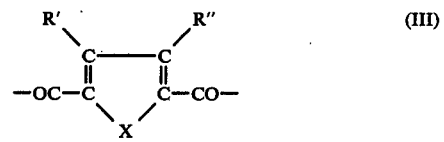

wherein X is oxygen or sulfur, and R' and R" are independently selected from the group consisting of hydrogen, alkyl, and aryl radicals; and constituting at least 10 mol% of said —A— groups and a second dicarboxylic group constituting that portion of said A groups that is not made up of dicarboxylic radicals of the formula (III), and being the dicarbonylic radical from one or more dicarboxylic acids selected from the group consisting of fumaric, mesaconic, orthophthalic, isophthalic, terephthalic and thiofurazan-3,4-dicarboxylic acid.

2. A reverse osmosis anisotropic gel membrane of a polymeric piperazinamide consisting essentially of the repeating unit having a structure defined by the formula (I):

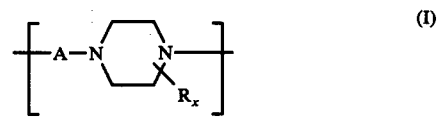

wherein the group defined by the general formula (II):

is a bivalent piperazine radical, wherein x is a whole number from 1 to 8, and R is alkyl; said —A— groups representing a dicarbonylic group having a structure defined by the formula (III):

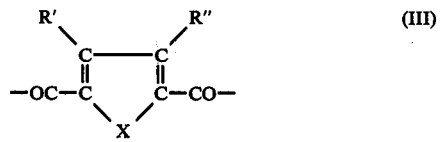

wherein X is oxygen or sulfur, and R' and R" are independently selected from the group consisting of hydrogen, alkyl, and aryl radicals.

3. A reverse osmosis anisotropic gel membrane of the polymeric piperazinamide of claim 1.

* * * * *

UNITED STATES PATENT OFFICE
CERTIFICATE OF CORRECTION

Patent No. 4,123,424      Dated October 31, 1978

Inventor(s) LINO CREDALI et al

It is certified that error appears in the above-identified patent and that said Letters Patent are hereby corrected as shown below:

Column 2, line 14: "tially of by" should read -- tially of --; line 33: "bisvalent" should read -- bivalent --; line 37: "diferring" should read -- differing --.

Column 8, line 35: "The" should read -- This --.

Signed and Sealed this

Twenty-sixth Day of February 1980

[SEAL]

Attest:

SIDNEY A. DIAMOND

Attesting Officer      Commissioner of Patents and Trademarks